Oct. 30, 1962   D. HAUBOLD   3,060,439
FASTENING MEANS FOR STAPLING MACHINES
Filed April 25, 1960

INVENTOR
DIETER HAUBOLD

Richards & Heier

ATTORNEYS

United States Patent Office 3,060,439
Patented Oct. 30, 1962

3,060,439
FASTENING MEANS FOR STAPLING MACHINES
Dieter Haubold, Lutzowstrasse 8–10,
Hannover, Germany
Filed Apr. 25, 1960, Ser. No. 24,428
Claims priority, application Germany Apr. 24, 1959
3 Claims. (Cl. 1—46)

This invention relates to fastening means for stapling machines. These fastening means such as staples, clasps or clips, nails or pins etc. are often joined to form strips or rods which are introduced into the magazine of the fastener applying machine. By means of a driving device running in a pusher slide the fasteners are driven into the workpiece. In order to introduce the said fastener means into the machine, the magazine of the latter has to be opened which, in the case of the high duty machines utilized for industrial purposes and driven either mechanically or by means of compressed air, leads to undesirable interruptions of operation.

It is an object of the present invention to allow of the loading of the magazine of fastener applying machines without opening the magazine every time.

It is a further object of the invention to firmly hold the fastening means inside the magazine without having to close the latter for this purpose.

A further object of the invention consists in imparting, to the magazine, such a shape that the fastening means introduced into it are held securely in operating position.

Further objects of the invention are discussed in detail in the following description in connection with the corresponding drawings showing examples of various forms of construction in application of the invention.

Referring to the drawings.

The invention principally consists in providing the stem or flange of the fastener insertable, from above, into the magazine, with a recess subsequently engaged by a suppressor installed in the magazine. Preferably, this suppressor is fixed to a wall of the magazine and then holds in position the fastener inserted into the magazine so same is securely held after insertion into the magazine. In the case of fasteners joined to form strips or rods, the stems or flanges of the fasteners may be provided, on either side, with the recess serving as a catch for the suppressor so the strip or rod may be inserted at random into the magazine.

The application of the invention is not, by any means, restricted to its use with fasteners joined to form strips or rods. It may, to the same advantage, be used with fasteners, preferably nails or pins, inserted individually into the magazine. In this case, it will be found expedient to shape the recess into an annular groove the suppressor cannot fail to engage.

In an emphasized form of construction of the inventional idea, the suppressor utilized may consist in a leaf type spring fixed to one wall of the magazine.

The lower end of this spring will then serve as a catch. In this case, it will be found convenient to impart, to the recess, the shape of a slot. It is, however, also possible to lodge, in one wall of the magazine, a tilting pawl engaging the recess of the nail stem or staple flange. If the fasteners consist in U-shaped staples the recess functioning as a notch may be provided either on the inside or on the outside of the flange.

Figure 1:
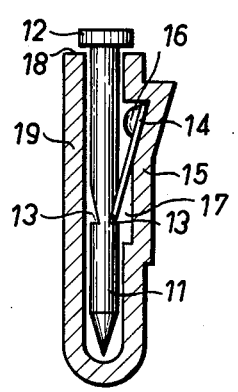
FIG. 1 is a cross section of a magazine for holding nails or pins.

In the form of construction of FIG. 1, the stem 11 of the nails joined to form a strip is provided with a head 12 and, in the middle, is furnished with slots 13 arranged in symmetrical position to each other. One of these slots is engaged by the lower end of a leaf type spring 14 fixed, by means of rivets 16, to the projection of the wall 15 of the magazine 19 and having the same, or approximately the same, length as the loading space of the magazine 19. The seat 17 of the leaf type spring 14 is sloped causing the leaf type spring 14 to form an acute angle with the longitudinal axis of the nail stem 11.

The nail stem 11 is introduced, from above, into the open magazine 19 and rests, with the head 12, upon the top edge 18 of the magazine. When introducing the nail, the end of the leaf type spring 14 is pressed, by the cylindrical nail stem 11, into the projection of the magazine wall 15. As soon as the nail head 12 comes to rest upon the top edge 18 of the magazine, the end of the leaf type spring 14 engages the slot 13 causing the nail stem 11 to be held in its position in such a way that it cannot fall out of the magazine even if the device, as a whole, be tilted or revolved.

Figure 2:
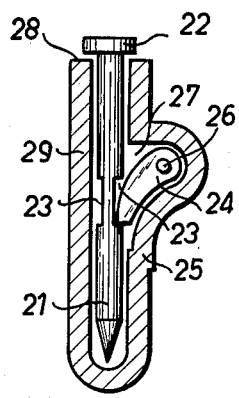
FIG. 2 is a cross section of another form of construction of a magazine for holding nails or pins.

With the form of construction shown by FIG. 2, the nail stem 21 the head 22 of which is resting in operating position upon the top edge 28 of the magazine 29, is provided on either side with a rectangular recess 23 engaged by a pawl 24 swiveling around a pivot 26 lodged in the projection of the magazine wall 25, same pawl being submitted to the action of a spring not represented in the drawing.

The same shape of the nail stem 11 or, respectively, 21 will suit the purpose in the case of pins not provided with a head 12 or, respectively, 22 in view of the fact that the nail stem 11 or, respectively, 21 is securely held in the position required in each individual case by the action of the suppressor 14 or, respectively, 24 engaging the recesses 13 or, respectively, 23.

The nail stems 11 or, respectively, 21, may either be joined to form strips or, respectively, rods or they may be introduced into the magazine individually. In the latter case, the recesses 13 or, respectively, 23 must be developed into annular grooves so the nail stem may be locked securely, in any position whatever, into the magazine 19 or, respectively, 29.

Figure 3:
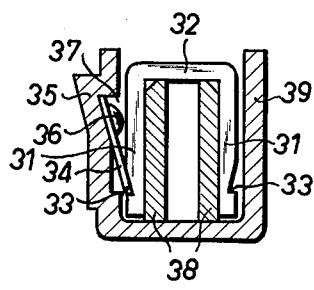
FIG. 3 is a cross section of a magazine for holding U-shaped staples.

FIG. 3 shows a development of the fastener into a U-shaped staple with both staple flanges 31 and the staple bridge 32. Either staple flange is provided, on the outside, with a slot engaged by the end of a leaf type spring 34 fixed, by means of rivets 36, to the projection of the magazine wall 37. In this case, the staples may be joined, in the usual fashion, to form rods or strips resting on a core 38 provided in the magazine 39, same core 38, in itself, being of some well-known construction.

Figure 4:
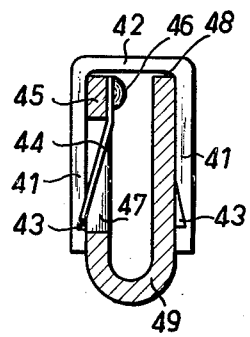
FIG. 4 is a cross section of another form of construction of a magazine for holding U-shaped staples.

With the form of construction shown in FIG. 4, either of the staple flanges 41 connected by the staple bridge 42 is provided, on the inside, with a recess 43 engaged by the end of a leaf type spring 44 fixed, by means of rivets 46, to the core 45 and movable in a recess 47 of the core 45. The cross section of the leaf type spring 44 is an angular one so that the end of the said spring is in a sloping position and engages the slot 43 of the staple flange 41. This arrangement locks the staple into its operating position in which the staple bridge 42 is resting upon, or immaterially spaced from, the upper surface of the magazine 49 formed by the core 45.

With the forms of construction shown in FIGURES 3 and 4, the pawl 24 of the form of construction shown in FIG. 2 or any other expedient suppressor may be utilized instead of the leaf type spring provided, however, that any of these must have the same length as the loading space, as does the said leaf type spring. With the forms of construction shown in FIGURES 1 and 2, too, and when utilizing either nails joined to form strips or rods or loose nails, the spring 14 or, respectively, the pawl 24 must have the same width as the loading space of the magazine 19 or, respectively, 29 so every single nail will be locked securely and uniformly into the open magazine.

The present invention covers fasteners of various types used in fastener applying machines; it is not restricted to nails and pins, but is also applicable to clasps, clips, bottom supports for furniture and the like.

In use, the fasteners are introduced into the magazine from the top, either individually or in the form of coherent strips, rods, staples or the like. Suitable spring-pressed pusher means well known in the art move the fasteners forward to the operating position wherein they are securely held against displacement by the suppressor of the present invention during the operation of the machine. The machine may be hand-operated, driven by compressed air or in any other suitable manner.

It will thus be seen that there is provided a device in which the several objects of the invention are achieved and which is well adapted to meet the conditions of practical use.

As various possible embodiments may be made of the above invention, and as various changes may be made in the forms of construction set forth, it is understood that all matter herein set forth or shown in the accompanying drawings is to be interpreted as illustrative and not in a limiting sense.

I claim:

1. A magazine having walls adapted to enclose an elongated portion of a fastener, and a leaf spring fixed to one of said walls and engaging a recess formed in said elongated portion.

2. A magazine having walls and a pawl pivotally carried by one of said walls and engaging a recess formed in an elongated portion of a fastener.

3. A magazine having walls engaging a U-shaped fastener staple and a leaf spring fixed to one of said walls and extending through an opening formed therein to engage an inner recess formed in one leg of said staple.

References Cited in the file of this patent

UNITED STATES PATENTS

| | | |
|---|---|---|
| 2,875,664 | Crooks | Mar. 3, 1959 |
| 2,880,480 | True | Apr. 7, 1959 |